Feb. 6, 1968 J. M. DIMOCK, JR 3,368,023

HERMETICALLY SEALED ENVELOPE STRUCTURE FOR VACUUM COMPONENT

Filed Jan. 11, 1965 2 Sheets-Sheet 1

INVENTOR.
JOSEPH M. DIMOCK, JR.
BY
John J. Leavitt

Feb. 6, 1968 J. M. DIMOCK, JR 3,368,023

HERMETICALLY SEALED ENVELOPE STRUCTURE FOR VACUUM COMPONENT

Filed Jan. 11, 1965 2 Sheets-Sheet 2

INVENTOR.
JOSEPH M. DIMOCK, JR.
BY
John J. Leavitt

United States Patent Office 3,368,023
Patented Feb. 6, 1968

3,368,023
HERMETICALLY SEALED ENVELOPE STRUCTURE FOR VACUUM COMPONENT

Joseph M. Dimock, Jr., San Jose, Calif., assignor to Jennings Radio Manufacturing Corporation
Filed Jan. 11, 1965, Ser. No. 424,600
10 Claims. (Cl. 174—50.5)

ABSTRACT OF THE DISCLOSURE

An envelope structure is provided utilizing a flexible metallic seal interposed between metallic and dielectric portions of the envelope in a manner to accommodate differences in thermal expansion and contraction between the metal and dielectric parts so as to preserve the integrity of the hermetic union therebetween. The seal is formed so that no part of the end cap structure or seal flange extends beyond the outer periphery of the dielectric member.

The invention relates to vacuum components, and particularly to such components as high power current interrupters in which the interrupter contacts are confined within a vacuum envelope.

In recent years the use of vacuum interrupters for interrupting high alternating and direct currents has increased materially primarily because of improvements in the design of interrupters which lowered their initial cost and increased their life expectancy and reliability. Areas of improvement in design have included new shielding structures to prevent vaporized contact material from being deposited on the interior surface of the envelopes, and novel contact configurations which force an arc formed during interruption to spin rapidly over the surface of the contact to thus eliminate much of the vaporizing of the contact material.

Other areas of improvement include new materials from which the contacts are formed, and from which the envelope enclosing the contacts is formed. Regarding the envelope, one of the problems that continues to plague the vacuum components industry has been the hermetic union of dissimilar materials, such as ceramic and metal, to provide a flexible union capable of accommodating differences in thermal expansion and contraction of the parts. Accordingly, it is one of the principal objects of the present invention to provide a seal structure for a vacuum switch envelope which is easily fabricated, presents no protrusions outside the envelope to reduce the external path between metallic members at different potentials, and which functions to flexibly and hermetically unite adjacent metal and ceramic members.

In the manufacture of vacuum electronic components it has been customary to fabricate the parts by conventional manufacturing techniques and to then assemble those parts into a composite whole, braze the loosely assembled parts in an appropriate oven or by heliarc welding protruding juxtaposed flanges, and then evacuate the sealed envelope through an appropriate tubulation connected to an exhaust system which is usually completely separate from and auxiliary to apparatus required for fabrication of the envelope parts and their subsequent assembly. This method of manufacture usually results in impurities being trapped in the metallic parts and within the sealed envelope which cannot be removed by conventional chemical cleaning and pumping techniques. It is therefore another important object of the present invention to provide a novel method of manufacture and assembly of the component parts of a vacuum electronic implement so as to eliminate or materially reduce such impurities, and reduce the elapsed time for fabrication of a given unit.

Another object of the invention is the provision of a novel method of fabrication of a vacuum switch in which the individual parts of the switch are initially outgassed, stored in a vacuum chamber until needed, loosely assembled in another vacuum chamber in approximate final relationship but held apart to permit the egress of gases from the interior of the envelope during an initial outgassing step at a predetermined temperature and subsequent movement of the adjacent parts into contact and brazing to thus eliminate the necessity of a tubulation or subsequent processing following the sealing of the envelope.

Another object of the invention is the provision of a vacuum switch in which the end plate structures, including the stems on which the contacts are supported, are formed from vacuum cast copper processed in a manner to remove impurities therefrom.

Broadly considered, the vacuum component of the invention, which for purposes of illustration and description is depicted as a vacuum switch, comprises a tubular dielectric portion closed at each opposite end by a metallic end plate assembly including a centrally disposed switch contact structure positioned within the dielectric portion intermediate its ends and supported on the end plate by a heavy electrically conductive stem.

A flexible metallic bellows is interposed between one of such stems and the associated end plate to hermetically seal the union of the stem to the end plate while enabling relative movement therebetween. Such relative movement permits making and breaking of the switch contact structure within the dielectric portion to interrupt or make a circuit therebetween. Appropriate shield means are provided within the envelope surrounding the contact structures and portions of the associated stems.

Referring to the drawings.

Figure 1:
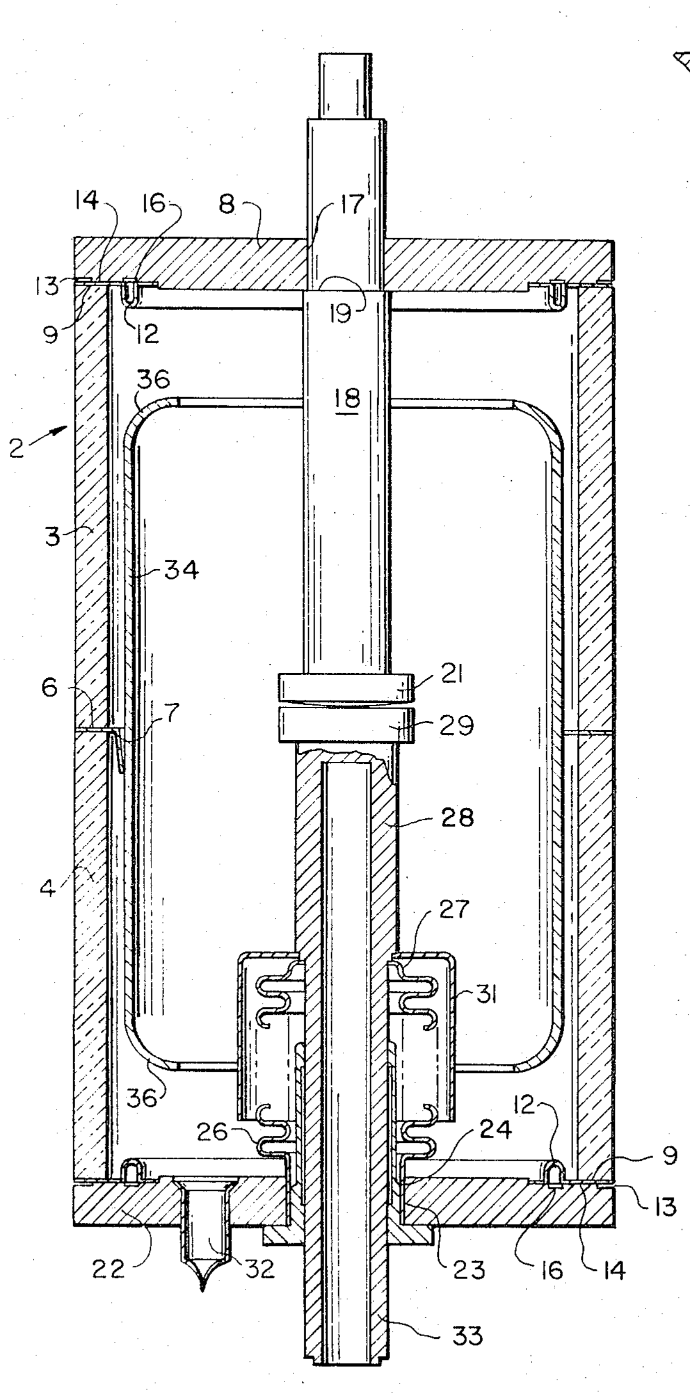
FIG. 1 is a vertical cross-sectional view of one embodiment of the switch with a portion of the structure being shown in elevation.

In more specific detail, the invention comprises an envelope designated generally by the numeral 2, fabricated from a first tubular dielectric member 3, axially aligned and hermetically brazed to a second tubular dielectric member 4. The two cylindrical members are preferably fabricated from high dielectric strength ceramic, such as aluminum oxide. Their adjacent ends are hermetically brazed through the medium of an annular sealing ring 6 having a plurality of circumferentially spaced tabs 7 integral with the inner periphery thereof and bent substantially at right angles to the rim of the seal member 6. On the end of the tubular dielectric member 3, remote from the seal flange 6 is positioned a heavy metallic end plate 8, conveniently fabricated from either OFHC copper or vacuum melted copper.

Figure 2:
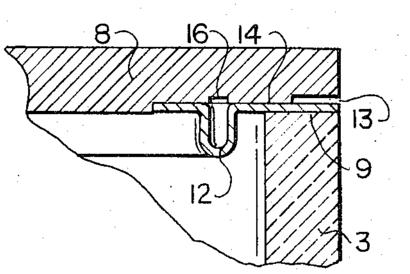
FIG. 2 is a fragmentary cross-sectional view illustrating one embodiment of a novel sealing structure for hermetically uniting each end plate assembly to the adjacent end of the dielectric envelope portion.

The outer periphery of the end plate 8 is hermetically and flexibly united to the adjacent end of the ceramic 3 by a sealing ring 9 having its outer periphery brazed to the end of the ceramic 3 and its inner periphery brazed to the plate 8 at a point remote from the outer periphery of the plate. Intermediate its inner and outer peripheries the sealing ring 9 is provided with an annular hollow bead 12 which extends at substantially right angles to the sealing ring so as to provide flexibility in the ring to accommodate differences in thermal expansion and contraction between ceramic 3 and the heavy metal end plate 8. As shown best in FIG. 2 an outer edge portion of the heavy plate 8 is rabbeted as at 13 to provide clearance between a surface portion 14 of the plate 8 and the surface of seal ring 9 next adjacent the outer periphery of these two members.

The width of the rabbet is such that when compared with the wall thickness of the ceramic member 3, the width of the rabbet is less than the wall thickness of the ceramic as shown so that upon final assembly of the parts abutting contact exists between the plate 8 and the seal ring 9 except over the area covered by the rabbet. Additionally, an annular groove 16 is provided in the surface of plate 8 immediately opposite the bead 12. During the manufacturing process the seal ring 9 is pre-brazed to the ceramic 3. Subsequently, the end plate 8 is brazed to the seal ring 9 at its inner periphery. It has been found that during this latter brazing operation there is a tendency for braze material from the union of seal ring 9 and the ceramic to migrate around the outer periphery of the seal ring and by capillary action be drawn between the seal ring 9 and plate 8 to thus inadvertently braze these two members together at their outer peripheries. But such brazing destroys the flexibility of the union and can result in rupture of the ceramic when the parts cool. The rabbet 13 is guaged in depth to prevent this migration of braze material.

Centrally disposed in an aperture 17 formed in the end plate 8 is a heavy copper stem 18 provided with a shoulder 19 abutting the inner surface of the end plate. The stem extends coaxially into the switch envelope and terminates within the envelope in a contact member 21 as shown best in FIG. 1.

On the end of the dielectric member 4 remote from the seal flange 6 is a heavy end plate 22 similar to the end plate 8 closing the opposite end of the envelope, and hermetically sealed to the adjacent end of the ceramic member 4 in like manner. Corresponding reference numbers have been used to designate like parts. Centrally formed in the end plate 22 is an aperture 23 gauged to receive the neck portion 24 of bellows 26, the inner end 27 of which is hermetically brazed intermediate the ends of an elongated stem 28 which extends through the aperture 23 and bellows 26. The inner end of the stem is provided with a contact member 29 adapted for abutting contact with the contact member 21 of the opposite stem. A shield cup 31 is provided within the envelope surrounding the bellows to intercept molten particles of contact material emanating from the contact members 21 and 29. A tubulation 32 is fixed in the end plate 22 for connection to an appropriate vacuum pumping system to evacuate the switch formed as above. On the other hand, where the switch is assembled within a vacuum chamber as is contemplated in the embodiment illustrated in FIG. 3, the final seal of the envelope constitutes the final step in fabrication and the switch is withdrawn from the vacuum brazing chamber in substantially completed condition. It will thus be seen that to make or break a circuit through the switch, it is only necessary to support the envelope by means of either one or the other of the heavy end plates 8 or 22 and apply an actuator mechanism to the remote end 33 of actuator stem 28.

In order to prevent the deposition of vaporized contact metal on the inner surface of the dielectric members 3 and 4, a tubular metallic shield 34 is provided supported intermediate its ends on tab members 7 integral with the sealing flange 6 disposed between dielectric members 3 and 4. Opposite ends 36 of the shield are spun inward as shown to prevent line-of-sight emanations from the contact members or points from striking the dielectric members 3 and 4.

Figures 3, 4, 5:
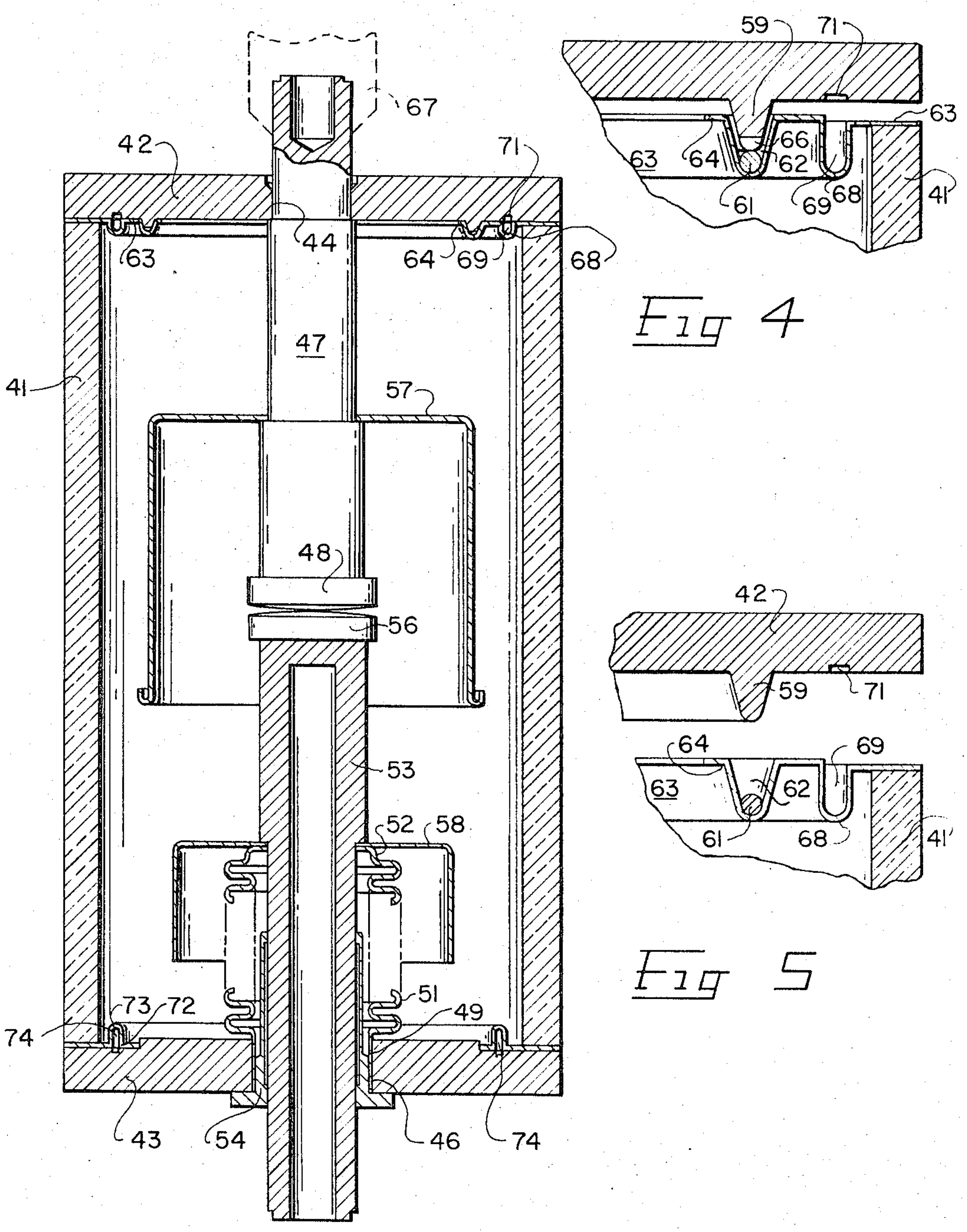
FIG. 3 is a vertical cross-sectional view of a vacuum switch of modified construction.
FIG. 4 is a fragmentary cross-sectional view illustrating a modified embodiment of a seal structure useful in hermetically uniting a heavy metallic plate to an associated dielectric member in the absence of a tubulation.
FIG. 5 is a fragmentary sectional view showing the separate parts forming the seal in exploded relationship.

In the embodiment of the switch illustrated in FIGS. 3 and 4 it is contemplated that the assembly of the switch will be accomplished within a vacuum chamber to thus eliminate the necessity of a tubulation and a separate pumping operation. This embodiment includes a tubular dielectric wall portion 41 closed at opposite ends by heavy metallic end plates 42 and 43 having, respectively, central apertures 44 and 46 therethrough. The aperture 44 in plate 42 receives a stem 47 which is brazed therein, and which is provided at its inner end with a contact plate or member 48. The aperture 44 in plate 43 receives the outer end 49 of bellows 51, the inner end 52 of the bellows being hermetically united to the stem 53, the outer end portion of which is slidably disposed in slide bearing 54 projecting through aperture 46. The inner end of the stem 53 is provided with a contact plate or member 56 adapted to abut the opposite contact member 48. Shield members 57 and 58 are provided fixed on stems 47 and 53 respectively, to shield the dielectric wall 41 and bellows 51.

As shown best in FIG. 3, in one aspect of this embodiment, the heavy end plate 42 is held apart from the adjacent dielectric member 41 by an integral annular bead 59, the inner end of which abuts a ring of solder 61 lying within the bottom of a channel 62 formed in the seal ring member 63. As shown, the channel 62 is formed adjacent the inner periphery 64 of the seal ring, and a multiplicity of circumferentially spaced notches 66 are formed in the end of the annular bead so that when the unit is raised in temperature to outgas the various parts of the combination there is ample space and passageways between the end plate 42 and the seal flange 63 to permit the escape of gas molecules radially outwardly from the interior of the envelope. Alternatively, the end plate 42 may be held in spaced relation to the seal flange by a support means 67 during the outgassing procedure (FIG. 5) and then lowered into position when a predetermined degree of vacuity has been achieved. The support means 67 may conveniently be controllable fingers adapted for control from outside the vacuum chamber.

In practice, the unit is held under vacuum at an elevated temperature for a time sufficient to secure the desired amount of outgassing prior to brazing, and the temperature is then raised sufficiently to melt the ring of solder 61. As soon as the solder ring melts, gravity forces the end plate into abutting relationship with the seal flange and the solder is drawn by capillary action between the surfaces of bead 59 and channel 62, thus forming a hermetic union between the end plate 42 and the associated seal flange. Flexibility in the hermetic union is insured by an annular bead 68 formed in the seal flange closely adjacent the dielectric envelope. The bead serves two functions. It accommodates differences in thermal expansion and contraction between the metallic end plate seal flange assembly and the dielectric member 41, and it provides a space or channel 69 cooperating with a groove 71 in the end plate to prevent migration of braze material radially outwardly along the surface of the seal flange next adjacent the end plate.

The end plate 43 at the other end of the envelope is united to the associated seal flange 72 in a somewhat different manner than the seal flange 63. The seal flange 72 is brazed at its outer periphery to the metallized end of the dielectric cylinder 41 preferably prior to placement of the assembly in the vacuum brazing oven although this union has successfully been effected after such placement. The seal flange is provided with an annular bead 73 intermediate its inner and outer peripheries and extending perpendicularly away from the associated end plate 43 to provide a space or channel 74 therewithin cooperating with an opposed groove 76 in the end plate to prevent migration of braze material along the seal flange. The inner periphery of the seal flange is brazed to the end plate as shown.

It will be apparent from FIG. 3 that the rabbet 13 (FIGS. 1 and 2) has been omitted from this embodiment. The reason is that in this embodiment the inner periphery of the seal flange 72 is displaced a small amount, in the order of .025", toward the associated end plate. The result is that upon abutment of the end plate with the inner periphery of the seal flange to effect brazing thereof, a space remains between the outer periphery of the seal flange and the outer peripheral portion of the end plate. Migration of braze material radially inwardly between these two surfaces is thus very effectively prevented. It will of course be apparent that as atmospheric pressure presses inwardly on the ends of the envelope the seal flange portions will assume the position shown in FIG. 3. The resulting flexible and hermetic union between the heavy metal end plate and dielectric cylinder is thus effected in a minimum height and with no protrutions beyond the exterior surfaces of the envelope.

I claim:

1. In an envelope structure adapted to be hermetically sealed and vacuumized, the combination comprising a tubular dielectric envelope portion have metallized end edges, a metallic end plate closing each opposite end of the dielectric envelope portion, and a seal flange hermetically interposed between each end plate and the associated end of the dielectric envelope portion, an outer peripheral portion of said seal flange being hermetically united to the metallized end of the dielectric envelope portion and an inner peripheral portion of the seal flange being hermetically united to the end plate within the envelope.

2. The combination according to claim 1, in which an annular hollow bead is provided in said seal flange intermediate the inner and outer peripheries thereof to accommodate differences in transverse expansion and contraction between each end plate and the dielectric envelope portion.

3. In an envelope structure adapted to be hermetically sealed and vacuumized, the combination comprising a tubular dielectric envelope portion having metallized end edges, a metallic end plate closing each opposite end of the dielectric envelope portion, at least one of said end plates having an annular bead projecting therefrom, and a seal flange hermetically interposed between each end plate and the associated end of the dielectric envelope portion, an outer peripheral portion of said seal flange being hermetically united to the metallized end of the dielectric envelope portion and an inner peripheral portion of the seal flange being hermetically united to the end plate within the envelope, one of said sealing flanges having an annular channel therein engaged by said annular bend projecting from the associated end plate.

4. The combination according to claim 3, in which said annular bead is brazed within the annular channel.

5. The combination according to claim 4, in which said annular bead is provided with a plurality of circumferentially spaced notches effective to communicate the interior of the envelope with the exterior thereof prior to brazing of the annular bead within the annular channel.

6. The combination according to claim 3, in which an annular hollow bead is provided in said seal flange intermediate said annular channel and the outer periphery thereof to accommodate differences in transverse expansion and contraction between the dielectric envelope and the associated end plate.

7. The combination according to claim 6, in which an annular groove is formed in each end plate opposite said hollow bead in the seal flange to prevent migration of braze material radially outwardly along the surface of the end plate.

8. In an envelope structure adapted to be hermetically sealed and vacuumized, the combination comprising a tubular dielectric envelope portion having metallized end edges, a metallic end plate closing each opposite end of the dielectric envelope portion, a seal flange hermetically interposed between each end plate and the associated end of the dielectric envelope portion, an outer peripheral portion of said seal flange being hermetically united to the metallized end of the dielectric envelope portion and an inner peripheral portion of the seal flange being hermetically united to the end plate within the envelope, and a rabbet formed in each end plate opposite the peripheral portion of the seal flange united to the dielectric envelope portion to prevent migration of braze material radially inwardly along the surface of the end plate.

9. In an envelope structure adapted to be hermetically sealed and vacuumized, the combination comprising a tubular dielectric envelope portion having metallized end edges, a metallic end plate closing each opposite end of the dielectric envelope portion, a seal flange hermetically interposed between each end plate and the associated end of the dielectric envelope portion, an annular hollow bead in said seal flange intermediate the inner and outer peripheries thereof to accommodate differences in transverse expansion and contraction between each end plate and the dielectric envelope portion, an outer peripheral portion of said seal flange being hermetically united to the metallized end of the dielectric envelope portion and an inner peripheral portion of the seal flange being hermetically united to the end plate within the envelope, and an annular groove formed in each end plate opposite said hollow bead in the seal flange to prevent migration of braze material radially outwardly along the surface of the end plate.

10. In an envelope structure adapted to be hermetically sealed and vacuumized, the combination comprising a tubular dielectric envelope portion having metallized end edges, a metallic end plate closing each opposite end of the dielectric envelope portion, a seal flange hermetically interposed between each end plate and the associated end of the dielectric envelope portion, an outer peripheral portion of said seal flange being hermetically united to the metallized end of the dielectric envelope portion and an inner peripheral portion of the seal flange being hermetically united to the end plate within the envelope, a rabbet formed adjacent the outer periphery of the end plate opposite the portion of the seal flange united to the dielectric envelope portion to prevent migration of braze material between the seal flange and end plate so as to insure slideable abutment therebetween, an annular groove in the end plate intermediate the inner and outer peripheries of the seal flange, and an annular hollow bead in the seal flange opposite said annular groove to accommodate differences in thermal expansion and contraction between each end plate and the dielectric envelope portion.

References Cited

UNITED STATES PATENTS

| | | | |
|---|---|---|---|
| 1,897,761 | 2/1933 | McCullough | 174—50.63 X |
| 2,863,027 | 12/1958 | Jennings | 200—144.2 |
| 3,125,698 | 3/1964 | Persson | 174—50.61 |
| 2,639,833 | 5/1953 | Schwarz | 220—2.3 |
| 2,650,683 | 9/1953 | McPhee et al | 287—198.365 |

LEWIS H. MYERS, *Primary Examiner.*

H. W. COLLINS, D. A. TONE, *Assistant Examiners.*